July 14, 1959  H. BLESS  2,894,606
FRICTION BRAKE FOR CATAPULTS
Filed Jan. 10, 1957  2 Sheets-Sheet 1
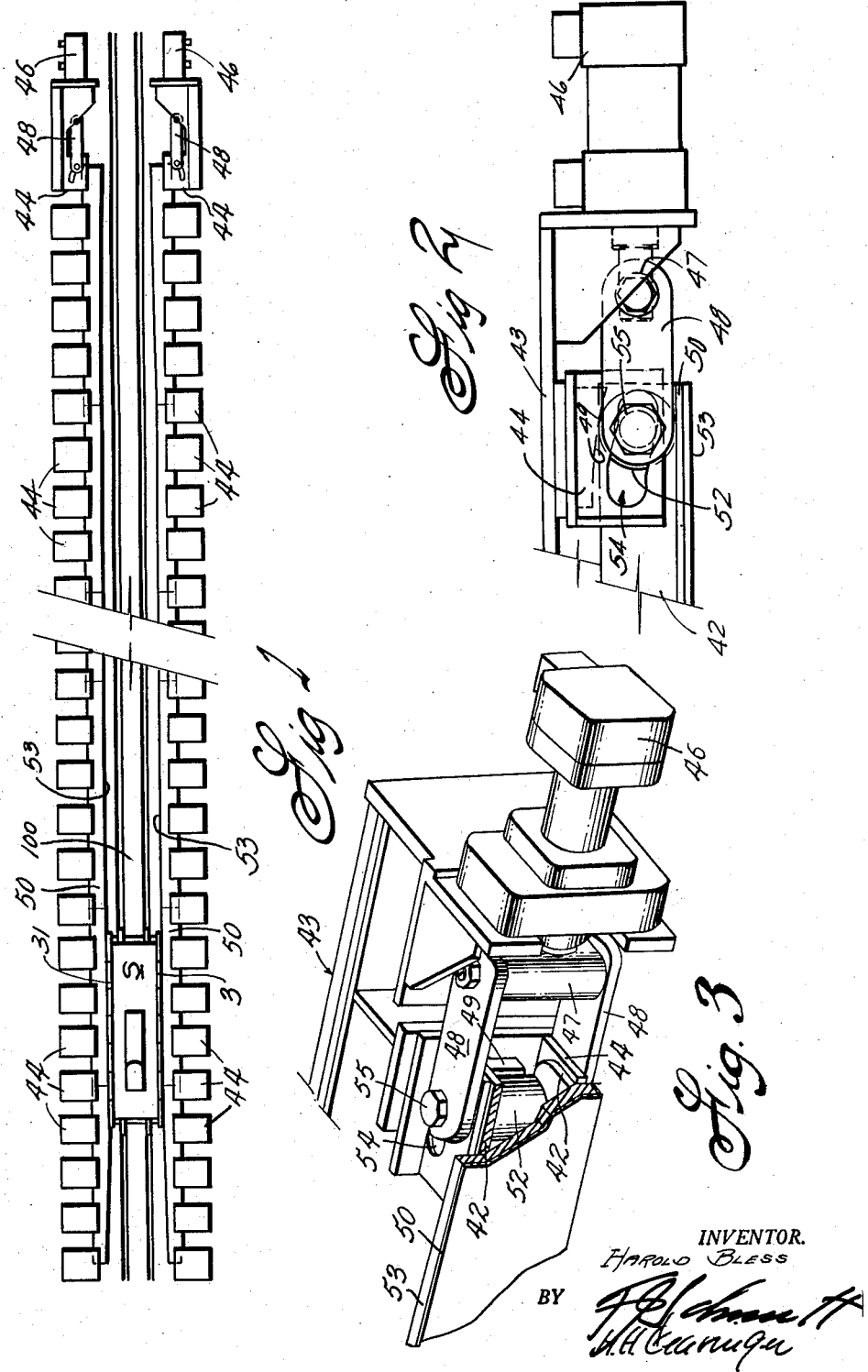

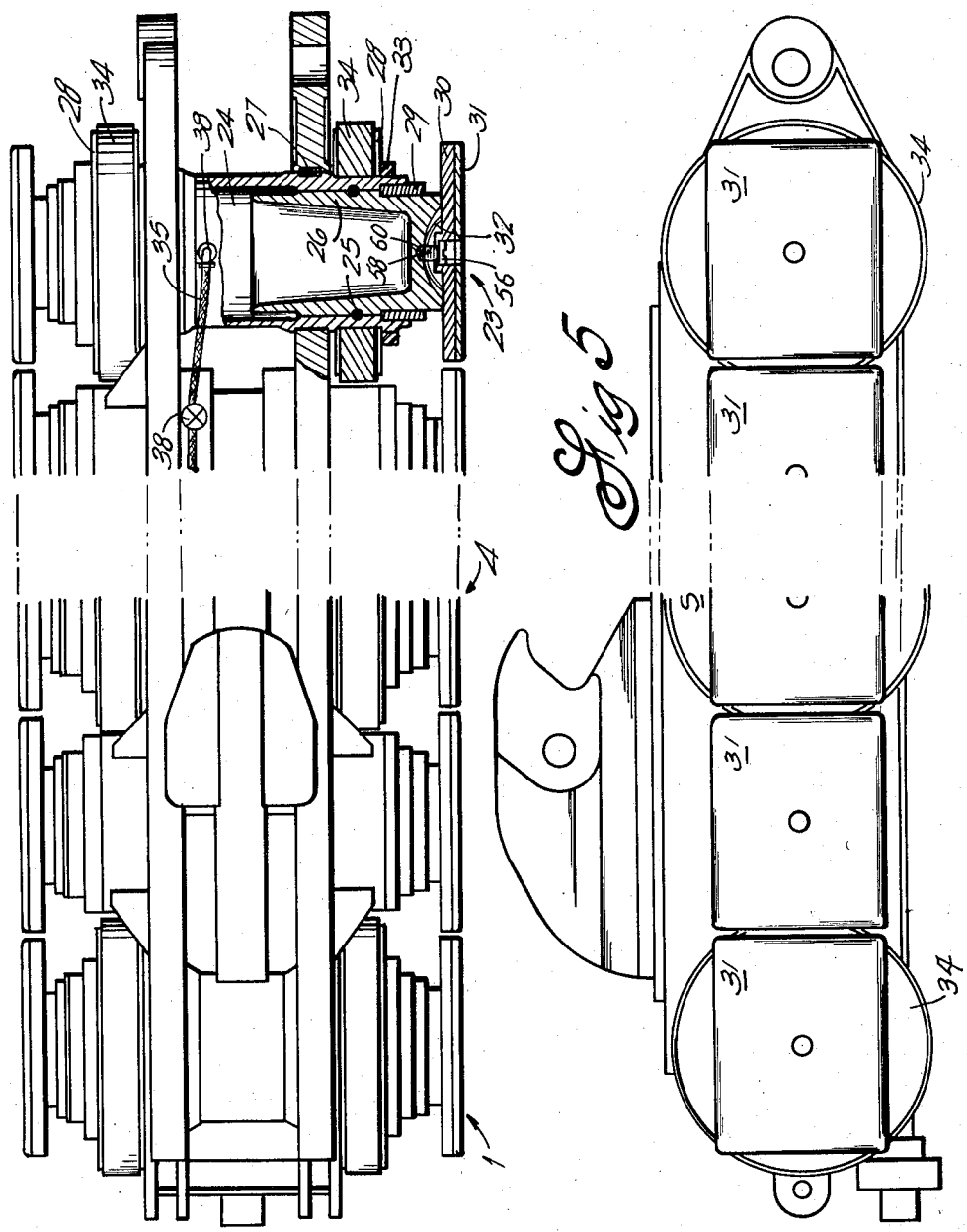

United States Patent Office 2,894,606
Patented July 14, 1959

2,894,606

FRICTION BRAKE FOR CATAPULTS

Harold Bless, Philadelphia, Pa., assignor to the United States of America as represented by the Secretary of the Navy Application January 10, 1957, Serial No. 633,512

6 Claims. (Cl. 188—62)

(Granted under Title 35, U.S. Code (1952), sec. 266)

The invention described herein may be manufactured and used by or for the Government of the United States of America for governmental purposes without the payment of any royalties thereon or therefor.

This invention relates to a braking means for a shuttle or any other similar system wherein a fast moving object must be halted in a limited amount of space. The particular invention relates to a catapult shuttle braking means wherein limitations of runway or guide space are obvious on an airplane carrier.

Prior art systems for arresting or braking the shuttle utilized either (a) a reeved hydraulic brake, or (b) single or dual water brakes, or (c) buffers. With the reeved brake, the apparatus required is massive and the maximum catapult end speed is limited. The water brakes, due to their short strokes, impart a very high reaction load to the foundation as well as high deceleration forces to the shuttle piston and shuttle. The buffers are also massive in structure, provide high reaction loads to the foundation, and cannot withstand high end speeds.

The object of this invention, therefore, is a braking device which allows high end speeds of the shuttle.

Another object of this invention is a braking device which is relatively compact and is not of a massive design.

A further object of this invention is a device which brakes a catapult shuttle with a relatively constant deceleration.

A still further object of this invention is a braking device which does not impart high reaction loads to its foundation thereby eliminating the need of huge supports for the braking system.

These and other objects will be readily apparent to those skilled in the art from an examination of the following description and attached drawings wherein:

Figure 1 is a diagrammatic view of the shuttle and the braking assemblies,

Figure 2 is a top plan view of a forward track control assembly,

Figure 3 is a perspective view of a portion of the track assembly at its forward end showing the relation between a brake rail, a rail supporting cam bracket, and a rail actuating means, Figure 4 is a plan view of the shuttle with parts in cross-section, and Figure 5 is an elevation view of the shuttle.

Referring to Figure 1, a shuttle S rides in slot 100. Additional guide means are provided, but these means, per se, form no part of the present invention. The shuttle has attached thereto the airplane to be launched (not shown) via a releasable cable (not shown). Attached to the shuttle are a plurality of brake linings 31 movable laterally relative to the shuttle. At the end of the shuttle launching stroke, in slot 100, where braking of shuttle S is desired, is a pair of spaced bearing rails 50 having the surfaces facing each other provided with brake linings 53. The rails 50 are movably mounted in a plurality of fixed mounting and control cam brackets 44, which are hereinafter described in detail, in a manner so that they can be reciprocated at a slant, that is, obliquely with respect to the direction of shuttle travel. Movement of the rails in the general forward direction, which is the launching line of flight of the shuttle, decreases the distance between the rails, whereas the distance is increased with their opposite, or aft, movement.

At battery or readiness for braking the shuttle S which is to be launched, it is preferred that the rails be set so that the distance between them is something less than the possible minimum, and it is such that the brake linings 31 on the shuttle S will engage the rail linings sufficiently to produce the necessary friction to halt the shuttle. Obviously the forward motion of the shuttle when it frictionally engages the rails 50 will tend to carry them along in its forward direction. Since the rails are mounted to move obliquely, this movement will cause them to decrease the distance separating them and exert a pinching action on the shuttle and increase braking action.

Thus, upon launching of the shuttle S and attached aircraft by means not shown, the aircraft releases itself from the shuttle after a short distance of travel while the shuttle continues in its guide path. The outwardly held brake linings 31 engage the slanted brake rail and the friction developed between the linings and the rail brings the shuttle to a complete stop. After the shuttle has been stopped, in order to retract it for subsequent launchings, it is required in order to eliminate unnecessary brake lining wear that the rail members are disengaged from the shuttle member without developing any braking friction as results if this is performed by merely pulling the shuttle and rails in opposite directions. Preferably separation of the brake rails and shuttle is achieved by actuating a hydraulic means 46 located at the forward end of each of the rails 50 which moves the rails rearwardly and causing them to move away from each other at a slant thus increasing the distance between them sufficiently to permit free withdrawal of the shuttle.

The specific construction used to perform the above braking function is illustrated in Figures 2–5. Referring to Figures 4 and 5, the shuttle mechanism S is seen to comprise a rear truck 1, a center truck 4, and forward truck 23; the rear and forward trucks are welded to the center truck to provide a unitary structure. Also welded to the truck frames are a plurality of cylinders 24 adding rigidity to such structure. Contained in each cylinder are a pair of opposing pistons 26 (only one shown in Figure 4) with the closed end of each piston mounted adjacent one of the open ends of the cylinder. O rings 25 provide the proper seal between the piston and cylinder; a conventional key 27 secured in the walls of each of the cylinders and pistons prevents rotational movement of the pistons and thus restricts the piston to lateral movement only.

Adjacent the ends of selected groups of cylinders are secured rings 28 which form a support for roller bearing wheels 34. Piston nut 29 is threaded into the wall of each such cylinder end providing a limit stop for the outward axial travel of each piston; retainer 33 maintains ring 28 and bearing wheels 34 in position.

Brake shoe 30 is secured to the head of piston 26 by a bolt 56 the threaded shank 58 of which is carried or received in a threaded hole 60 in the head of the piston. Bolt 56 is carried loosely in hole 60 and permits a small amount of rotary play between the shoe 30 and the head of piston 26 to thereby allow shoe 30 to rotate slightly relative to the piston to thus insure proper contact between the brake linings 31 and the brake rails 53. Bolt 56 carries a leaf spring 32 having the ends thereof seated on brake shoe 30 and the medial portion thereof seated on the head of piston 26. The bias of spring 32 constantly tends to separate the shoe 30 from the piston 26 and thus tends to resiliently hold the shoe 30 at a predetermined angle or in a predetermined position relative to the piston to thereby further insure the proper contact between the brake linings 31 and the braking rails 53.

In the instant shuttle, eight cylinders are provided with each cylinder having a pair of linings thereby providing sixteen individual brake lining elements.

The forward track section (Figs. 2 and 3) containing the braking rail consists of a braking rail 50 with its associated liner 53. Fixed structure 43 provides a means of support for a substantially U-shaped cam bracket 44. The bracket 44 is secured at its bight portion to the fixed structure 43, which may be a metal girder as is common in a ship's super structure, by some well known means, as a weld. The position of the bracket is such that its legs are in planes parallel to a plane containing the shuttle's line of travel with their ends directed inward, that is, transverse to the line of shuttle travel. Each of the brackets 44 (Figure 1) is similarly mounted to identical fixed structure (not shown) to provide an anchor therefor. Each bracket 44 has a pair of opposed slots 54 therein, one in each of its legs, with a part of the axis of the slots at an angle with the axis of the brake rail.

A hydraulic cylinder 46 for actuating each of the brake rails 50 is supported by fixed structure 43 and has a cross-head 47 at one end thereof. Attached to the cross-head 47 are a pair of links 48 which are connected to one end thereof to a pin 55 that rides in bracket slots 54. A roller bearing assembly 52 is secured to this pin, which assembly bears against a cam surface 49 formed on the bight portion of bracket 44. Brake rail 50 is attached to the pin 55 and portions of the bearing assembly 52 by means of a pair of ears or cross support pieces 42 carried by the brake rail.

The aft ends of the brake rails (Fig. 1) have a similar support structure as the cam, bearing assembly, and cam bracket of the opposite end. In addition the aft ends of rails 50 and liners 53 are tapered to permit an easy entry of the braking shoes on the shuttle.

In the specific operation of the particular unit just described, the shuttle cylinders are charged at inlet 38 forcing the pistons in each cylinder outwardly. The shuttle is shot forward by means not shown with the aircraft secured by a cable. When the aircraft is launched, the free shuttle enters the tapered brake rail portions and subsequently the main portion of the braking rails. The retarding brake action of shuttle liners 31 frictionally engaging liners 53 brings the shuttle to a stop.

To retract the shuttle, conventional retraction means, not shown, are used. However, before the shuttle can release itself from the brake rail, the brake elements must be separated from each other. Thus, hydraulic motor 46 is actuated forcing links 48 rearward (to the left as viewed in Figures 1, 2 and 3). Pin 55 rides in slot 54 and roller assembly 52 rides against cam 49. The brake rails not only are pushed rearward but also away from linings 31. The shuttle is freed and also given an initial impetus for its retraction stroke.

It is evident that the deceleration forces may be varied by an adjustment of each hydraulic ram 46. Positioning the ram or bearing assembly 52 on cam 49 between the two extreme positions will vary the degree of contact between the brake linings on the shuttle and the rail.

Obviously many modifications and variations of the present invention are possible in the light of the above teachings. It is therefore to be understood that within the scope of the appended claims the invention may be practiced otherwise than as specifically described.

What is claimed is:

1. A braking device for arresting the movement of a shuttle member or the like adapted for movement in a predetermined direction along a fixed path comprising a plurality of opposed brake shoes carried by said shuttle member on opposite sides thereof and extending substantially transversely thereof, a plurality of spaced support members mounted outwardly of and on opposite sides of said fixed path of movement of said shuttle member and extending substantially parallel thereto, cam means mounted on each of said support members, roller means contacting with each of said cam means and being moveable transversely of said path of movement of said shuttle member upon reciprocation thereof relative to said cam means, a braking rail operatively connected to each of said roller means on opposite sides of said path of movement of said shuttle member and extending substantially parallel to said path of movement of said shuttle member, and separate power means operatively connected to said roller means on opposite sides of said path of movement of said shuttle member for reciprocating each of said roller means relative to each of said cam means to thereby move said opposed braking rails transversely of said path of movement of said shuttle member and into braking engagement with said brake shoes carried by said shuttle member.

2. A braking device for arresting the movement of a shuttle member or the like adapted for movement in a predetermined direction along a fixed path comprising a plurality of opposed brake shoes carried by said shuttle member on opposite sides thereof and extending substantially transversely thereof, fixed support means mounted outwardly of and on opposite sides of said fixed path of movement of said shuttle member and extending substantially parallel thereto, a plurality of spaced and substantially U-shaped brackets carried by said fixed support means on opposite sides of said path of movement of said shuttle member, each of said substantially U-shaped brackets having a pair of opposed slots in the leg portions thereof, cam means carried by the bight portion of each of said substantially U-shaped brackets, a pin carried in said opposed slots in each of said substantially U-shaped brackets and being moveable in said slots, roller means carried by each of said pins for engagement with said cam means and being moveable substantially transversely of said path of movement of said shuttle member upon movement of said pins in said slots, a braking rail operatively connected to each of said pins on opposite sides of said path of movement of said shuttle member and extending substantially parallel to said path of movement of said shuttle member, a pair of links carried by one of said pins on opposite sides of said path of movement of said shuttle member, and separate power means connected to each of said pair of links for imparting movement to said links and said pins to move said pins and roller means substantially transversely of said path of movement of said shuttle member and thereby move said pair of opposed brake rails substantially transversely of said path of movement of said shuttle member and into braking engagement with said brake shoes carried by said shuttle member.

3. A braking device as claimed in claim 2 wherein each of said brake shoes and each of said braking rails carry a brake lining, said linings on said shoes being adapted to frictionally engage said linings on said rails.

4. A braking device as claimed in claim 2 wherein said plurality of opposed brake shoes are each operatively connected to a pneumatically controlled piston moveable in a cylinder carried by said shuttle member, each cylinder being open at both ends and having a pair of opposed pistons therein moveable in opposite directions.

5. A braking device as claimed in claim 4 wherein each of said brake shoes is connected to each of said pistons by a bolt loosely carried in the head of each piston and a leaf spring positioned between the head of each piston and each brake shoe, each of said leaf springs constantly tending to separate each of said brake shoes and said pistons and thereby permitting relative movement between said brake shoes and said pistons.

6. A braking device as claimed in claim 2 wherein each of said brake rails on opposite sides of said path of movement of said shuttle member is connected to said pins by a plurality of pairs of ears carried by each of said brake rails, each of said pair of ears extending substantially transversely of said rails and having aligned apertures therein to accommodate the passage of a pin therethrough.

References Cited in the file of this patent

UNITED STATES PATENTS

| | | |
|---|---|---|
| 952,494 | Atwood | Mar. 22, 1910 |
| 2,651,387 | Genter | Sept. 8, 1953 |

FOREIGN PATENTS

| | | |
|---|---|---|
| 291,581 | Great Britain | June 7, 1928 |